US008694630B1

(12) United States Patent
Keralapura et al.

(10) Patent No.: US 8,694,630 B1
(45) Date of Patent: Apr. 8, 2014

(54) SELF-LEARNING CLASSIFIER FOR INTERNET TRAFFIC

(75) Inventors: Ram Keralapura, San Jose, CA (US); Marco Mellia, Turin (IT); Luigi Grimaudo, Turin (IT)

(73) Assignee: Narus, Inc., Sunnyvale, CA (US)

(*) Notice: Subject to any disclaimer, the term of this patent is extended or adjusted under 35 U.S.C. 154(b) by 151 days.

(21) Appl. No.: 13/300,342

(22) Filed: Nov. 18, 2011

(51) Int. Cl.
*G06F 15/173* (2006.01)

(52) U.S. Cl.
USPC .......................................... 709/224; 709/223

(58) Field of Classification Search
USPC ................................................. 709/223, 224
See application file for complete search history.

(56) References Cited

PUBLICATIONS

Authors: Thuy T.T. Nguyen and Granville Armitage Title: A Survey of Techniques for Internet Traffic Classification using Machine Learning Date: Oct. 2008 ; Publisher: IEEE Communications Surveys & Tutorials; vol. 10 Issue 4 Pertinent pp. 56-76.*

Erman, Jeffrey, et al., "Offline/Realtime Traffic Classification Using Semi-Supervised Learning", Performance Evaluation, vol. 64, Issues 9-12, Oct. 2007, pp. 1194-1213.
Erman, Jeffrey, et al., "Traffic Classification Using Clustering Algorithms", MineNet '06 Proceedings of the 2006 SIGCOMM workshop on Mining Network Data, Sep. 2006.
Demiriz, Ayhan, et al., "Semi-Supervised Clustering Using Genetic Algorithms", Artificial Neural Networks in Engineering (ANNIE-99), ASME Press, 1999, pp. 809-814.

* cited by examiner

*Primary Examiner* — Larry Donaghue
*Assistant Examiner* — Marshall McLeod
(74) *Attorney, Agent, or Firm* — Fernandez & Associates, LLP

(57) ABSTRACT

A method for classifying network traffic, including (1) processing a first working set portion of a flow batch for a first iteration by dividing the first working set portion into clusters and filtering a cluster by (i) identifying a first server port as most frequently occurring comparing to all other server ports in the cluster, (ii) in response to determining that a first frequency of occurrence of the first server port in the cluster exceeds a pre-determined threshold: (a) identifying the cluster as a dominatedPort cluster, (b) removing the cluster from the first working set portion to generate a remainder as a second working set portion, and (c) removing, from the cluster to be added to the second working set portion, one or more flows having different server port than the first server port, and (2) processing the second working set portion for a second iteration.

24 Claims, 4 Drawing Sheets

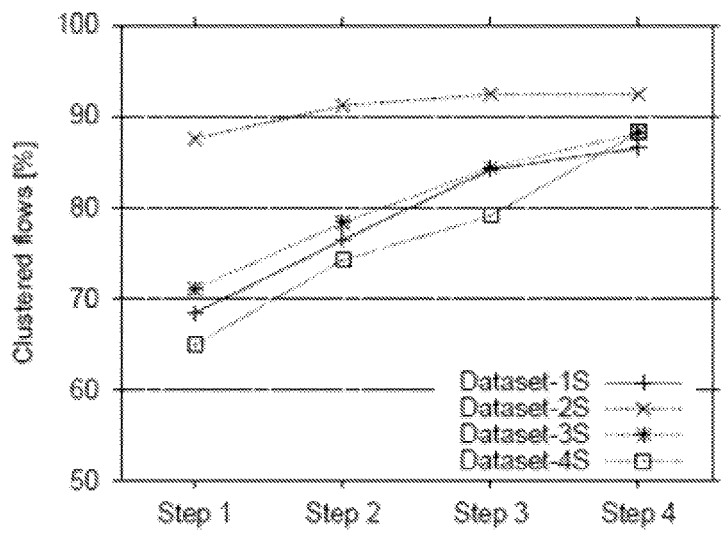
FIG. 3A: Fraction of clustered flows at each step.
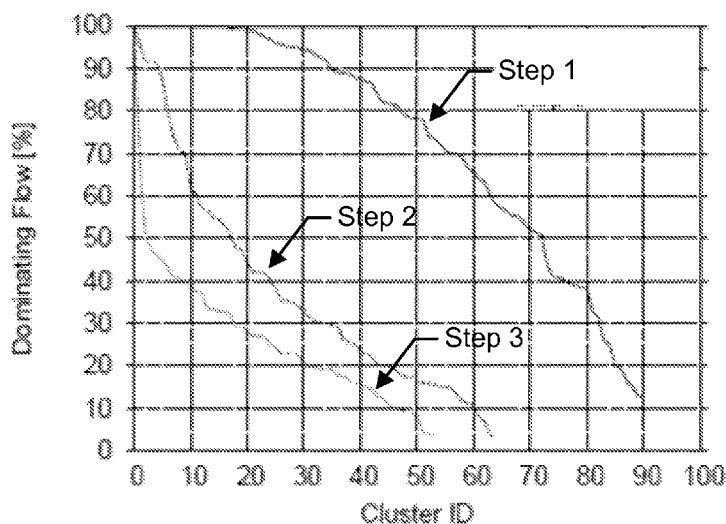
FIG. 3B: Fraction of flows directed to the dominating *srvPort* in each cluster for different steps

SELF-LEARNING CLASSIFIER FOR INTERNET TRAFFIC

BACKGROUND OF THE INVENTION

1. Field of the Invention

The present invention relates to computers and computer networks. More particularly, the invention relates to classifying network traffic in a computer network.

2. Background of the Related Art

Identifying the flows generated by different application-layer protocols is of major interest for network operators. For Internet service providers (ISPs), identifying traffic allows them to differentiate the QoS (quality of service) for different types of applications, such as voice applications and video applications. Moreover, it enables them to control high-bandwidth and non-interactive application, such as peer-to-peer (P2P) applications. For enterprise networks, it is very important for administrators to know activities on their network, such as services that users are running, the application dominating network traffic, etc. Traffic classification is also important for securing the network. In fact, even traditional protocols are often used as means to control attacks, such as the use of IRC (Internet Relay Chat) to mange the C&C (command and control) nodes for botnets. Overall, traffic classification is the first step in building any kind of intelligence on a network.

Popular current solutions include Deep Packet Inspection (DPI), which does not scale since it requires tedious manual reverse engineering of protocols, a daunting problem given the proliferation of applications and protocols. Similarly, approaches based on statistical classification still deeply rely on the availability of a training set to extract signatures which must be updated with regularity. All these classifiers share some key limitations. First, to achieve a high classification accuracy, either a manual and cumbersome reverse engineering of protocols to identify the signatures in DPI or a tedious process to generate an accurate training set for behavioral classifiers is required. Second, the classifiers can identify only the specific applications they have been trained for. All other traffic is aggregated either in a generic class labeled as "unknown", or mislabeled as one of the known applications. In other words, these classifiers cannot identify the introduction of a new application, or changes in the applications' protocols or the users' behavior, unless a re-training phase is triggered.

Throughout this disclosure, the term "flow" refers to a sequence of packets from a source node to a destination node in the network. Generally, a flow is represented by a 5-tuple of <source IP address, destination IP address, source port, destination port, protocol>. In particular, the protocol in the 5-tuple refers to a layer 4 (i.e., transport layer) protocol, such as TCP, UDP, ICMP, etc. Further, the terms "application" and/or "application class" refer to a layer 7 (i.e., application-layer) protocol with a distinct documented behavior in terms of communication exchanges, control packets, etc. Examples of such application include HTTP, SMTP, MSN, BitTorent, Gnutella, POP3, MSN, EDonkey, Telnet, Samba, Yahoo im, etc. Moreover, the term "application" may be referred to as the label or the class of the flow depending on the context.

SUMMARY

In general, in one aspect, the invention relates to a method for classifying network traffic in a network. The method includes (1) obtaining a first flow batch comprising a first plurality of flows from the network traffic, (2) processing, by a processor of a computer system, a first working set portion of the first flow batch for a first iteration based on a first pre-determined algorithm, including (i) dividing the first working set portion into a plurality of clusters and (ii) filtering, based on a server port found in the cluster, a cluster of the plurality of clusters to generate a filtered cluster and a second working set portion of the first flow batch, (3) processing the second working set portion for a second iteration based on the first pre-determined algorithm, and (4) classifying the first flow batch based at least on the filtered cluster.

In general, in one aspect, the invention relates to a system for classifying network traffic in a network. The system includes a hardware processor, an acquisition module configured to obtain a first flow batch comprising a first plurality of flows from the network traffic, and a clustering module executing on the hardware processor and configured to (1) process a first working set portion of the first flow batch for a first iteration based on a first pre-determined algorithm, including (i) dividing the first working set portion into a plurality of clusters and (ii) filtering a cluster of the plurality of clusters based on a server port found in the cluster to generate a filtered cluster and a second working set portion of the first flow batch, (2) process the second working set portion for a second iteration based on the first pre-determined algorithm, and (3) classify the first flow batch based at least on the filtered cluster.

In general, in one aspect, the invention relates to a non-transitory computer readable medium storing instructions for classifying network traffic in a network. The instructions when executed by a processor of a computer includes functionality for (1) obtaining a first flow batch comprising a first plurality of flows from the network traffic, (2) processing a first working set portion of the first flow batch for a first iteration based on a first pre-determined algorithm, including (i) dividing the first working set portion into a plurality of clusters and (ii) filtering, based on a server port found in the cluster, a cluster of the plurality of clusters to generate a filtered cluster and a second working set portion of the first flow batch, (3) processing the second working set portion for a second iteration based on the first pre-determined algorithm, and (4) classifying the first flow batch based at least on the filtered cluster.

Other aspects and advantages of the invention will be apparent from the following description and the appended claims.

BRIEF DESCRIPTION OF DRAWINGS

FIGS. 3A and 3B show an example according to aspects of the invention.

DETAILED DESCRIPTION

Figure 1:
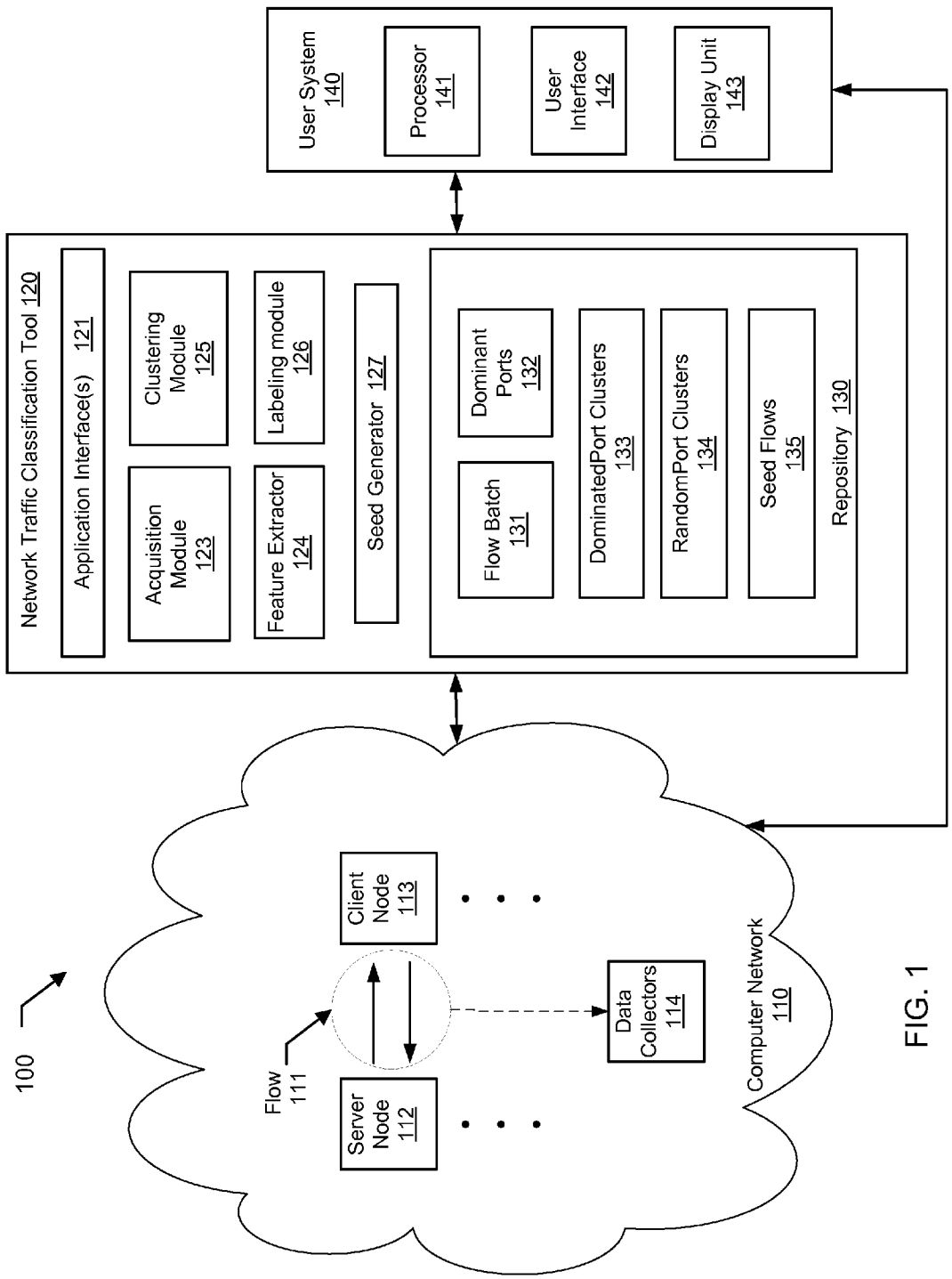
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments of the invention provide a method, system, and computer readable medium for network traffic classification. Specifically, for each incoming flow observed on a network, the classifier maps it to a group (referred to as a cluster) of flows that are similar in behavior and assigned the same label, which may be correlated with an application-layer protocol from which the group of flows are generated. Generally, the term "flow" may refer to a unidirectional flow or a bi-directional flow. A unidirectional flow includes only data packets traveling in one direction, either from server node to client node or vice versa. A bi-directional flow includes data packets traveling in both directions from server node to client node and vice versa. A bi-directional flow may be considered as a combination of two unidirectional flows traveling in opposite directions. In one or more embodiments, a bi-directional flow is classified by classifying the two unidirectional flows separately. Classifying the network traffic based on unidirectional flows provides a solution to the routing asymmetry at the Internet backbone, where one direction of a flow is often missing. Using unidirectional flows is important for allowing the classifier to be deployed anywhere in the network.

Advantageously, the classifier of the present invention may be applied to those applications generating statistically significant amount of traffic on a network, i.e., the most prominent classes of traffic. Accordingly, a large majority of traffic may be classified to allow proper network management and traffic engineering operations. In one or more embodiments, unsupervised data mining algorithms are used to automatically divide traffic into homogeneous (i.e., with similar behavior) subsets (i.e., clusters). In one or more embodiments, TCP flows are analyzed as the target of the classification. Each flow is characterized by using layer-4 metrics, such as segment size and inter-arrival time. Flows presented to the classifier are analyzed in "batches" where each batch (i.e., a group of flows) is analyzed in successive iterations of clustering phases interleaved with filtering phases. Specifically, each iteration of the analysis uses a combination of an unsupervised machine learning algorithm (e.g., k-means clustering algorithm) in a clustering phase and a filtering phase that follows each clustering phase to eliminate possible outliers. In one or more embodiments, filtering is based on server port number (referred to as servPort), which carries relevant information about the application and/or protocol associated with each flow. Flows that do not pass the filtering phase are collected and processed at the next iteration.

At the end of the clustering/filtering iterations to analyze a batch of flows, if any of the flow in a cluster already has an assigned label representing the application and/or protocol from which the flow is generated, other flows in the same cluster may inherit such label (i.e., being labeled using the same label) based on the homogeneity of the cluster. If multiple labeled flows are present in the same cluster, a voting scheme is used to resolve any inconsistency in assigned label(s). In case no labeled flows are present in a cluster, it is tagged for further analysis, such as DPI, behavioral analysis, or manual labeling. Accordingly, new and/or unknown set of flows may be automatically identified for further analysis as they emerge.

Labeled flows from one batch may be added into a subsequent batch as seed flows for labeling purposes. This is referred to as adaptive or progressive learning since flows labeled in a previous batch are used to seed the subsequent batches.

FIG. 1 shows a diagram of a system (100) for network traffic classification using subspace clustering techniques in accordance with one or more embodiments. The system (100) includes a network traffic classification tool (120), a user system (140), and a computer network (110). The network traffic classification tool (120) includes data repository (130), one or more application interfaces (121), acquisition module (123), feature extractor (124), clustering module (125), labeling module (126), and seed generator (127). The user system (140) includes a processor (141), a user interface (142), and a display unit (143). The computer network (110) may include wired and/or wireless portions of the Internet and/or other data communications networks such as wide area networks (WANs), local area networks (LANs), etc. Further, the computer network (110) includes network nodes (e.g., server node (112), client node (113), data collectors (114), etc.), which are devices configured with computing and communication capabilities for executing applications in the network (110). As shown in FIG. 1, the server node (112) and client node (113) communicate with each other by exchanging data packets forming a flow (111), which includes two unidirectional flows represented by two arrows. Although shown as a bi-directional flow in the example depicted in FIG. 1, the flow (111) may also be a single unidirectional flow in other examples. In one or more embodiments, the server node (112) and the client node (113) exchange data packets in the flow (111) as a result of an application executing on the server node (112) and the client node (113). In this context, the flow (11) is referred to as being generated by the application executing on the server node (112) and on the client node (113). In one or more embodiments, certain device(s) (e.g., data collectors (114)) within the computer network (110) may be configured to collect network data (e.g., flow (111)) for providing to the network traffic classification tool (120). Each of these components is described below. One of ordinary skill in the art will appreciate that embodiments are not limited to the configuration shown in FIG. 1.

In one or more embodiments of the invention, the network traffic classification tool (120) is configured to interact with the computer network (110) using one or more of the application interface(s) (121). The application interface (121) may be configured to receive data (e.g., flow (111)) from the computer network (110) and/or store received data to the data repository (130). Such network data captured over a time period (e.g., an hour, a day, a week, etc.) is referred to as trace or network trace. Network trace contains network traffic data related to communications between nodes in the computer network (110). For example, the network trace may be captured on a routine basis using the data collectors (114) and selectively sent to the application interface (121) from time to time to be formatted and stored in the repository (127) for analysis. For example, the data collectors (114) may be a packet analyzer, network analyzer, protocol analyzer, sniffer, netflow device, semantic traffic analyzer (STA), or other types of data collection device that intercept and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide network trace to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the network traffic classification tool (120).

In one or more embodiments, the user system (140) is configured to interact with a user using the user interface (142). The user interface (142) may be configured to receive data and/or instruction(s) from the user. The user interface (142) may also be configured to deliver information (e.g., a report or an alert) to the user. In addition, the user interface (142) may be configured to send data and/or instruction(s) to, and receive data and/or information from, the network traffic classification tool (120). The user may include, but is not limited to, an individual, a group, an organization, or some other entity having authority and/or responsibility to access the network traffic classification tool (120). Specifically, the context of the term "user" here is distinct from that of a user of the computer network (110). The user system (140) may be, or may contain a form of, an internet-based communication device that is capable of communicating with the application interface (121) of the network traffic classification tool (120). Alternatively, the network traffic classification tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the network traffic classification tool (120) (e.g., report, alert, etc.).

As shown, communication links are provided between the network traffic classification tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the network traffic classification tool (120), the user system (140), and the communication links may be part of the computer network (110).

In one or more embodiments, a central processing unit (CPU, not shown) of the network traffic classification tool (120) is configured to execute instructions to operate the components of the network traffic classification tool (120). In one or more embodiments, the memory (not shown) of the network traffic classification tool (120) is configured to store software instructions for analyzing the network trace to extract features, generating clusters and labels to identify the application(s) that generates the flows. The memory may be one of a variety of memory devices, including but not limited to random access memory (RAM), read-only memory (ROM), cache memory, and flash memory. The memory may be further configured to serve as back-up storage for information stored in the data repository (130).

The network traffic classification tool (120) may include one or more system computers, which may be implemented as a server or any conventional computing system having a hardware processor. However, those skilled in the art will appreciate that implementations of various technologies described herein may be practiced in other computer system configurations, including hypertext transfer protocol (HTTP) servers, multiprocessor systems, microprocessor-based or programmable consumer electronics, hand-held devices, network personal computers, minicomputers, mainframe computers, and the like.

In one or more embodiments, the network traffic classification tool (120) is configured to obtain and store data in the data repository (130). In one or more embodiments, the data repository (130) is a persistent storage device (or set of devices) and is configured to receive data from the computer network (110) using the application interface (121). The data repository (130) is also configured to deliver working data to, and receive working data from, the acquisition module (123), feature extractor (124), clustering module (125), labeling module (126), and seed generator (127). The data repository (130) may be a data store (e.g., a database, a file system, one or more data structures configured in a memory, some other medium for storing data, or any suitable combination thereof), which may store information (e.g., flow batch (131), dominant ports (132), dominatedPort clusters (133), randomPort clusters (134), seed flows (235), etc.) related to the network traffic classification. The data repository (130) may be a device internal to the network traffic classification tool (120). Alternatively, the data repository (130) may be an external storage device operatively connected to the network traffic classification tool (120).

In one or more embodiments, the network traffic classification tool (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the network traffic classification tool (120) is configured to support various data formats provided by the user system (140).

In one or more embodiments, the network traffic classification tool (120) includes the acquisition module (123) that is configured to obtain a network trace from the computer network (110), for example via data collectors (114). In one or more embodiments, the acquisition module (123) works in conjunction with the data collectors (114) to parse data packets and collate data packets belonging to the same flow tuple (i.e., the aforementioned 5-tuple). For example, such network trace, or information extracted therefrom, may then be stored in the repository (127) to be included in flow batch (131).

In one or more embodiments, a flow parser (e.g., acquisition module (123) in conjunction with data collectors (114) in FIG. 1) reconstructs (e.g., eliminates redundant packets, collates packets into a correct sequence, etc.) all the packets that correspond to the same traffic flow identified by the aforementioned 5-tuple. In one or more embodiments, the flows are captured and parsed throughout a pre-configured time interval recurring on a periodic basis (e.g., every minute, hourly, daily, etc.) or triggered in response to an event. Specifically, a flow F is identified when the first packet is observed; the flow ends when no packets have been seen for a given time $\Delta T$ (e.g., 5 ms). For TCP flows, TCP signaling segments may be used to detect appropriate flow start and end.

In one or more embodiments of the invention, the network traffic classification tool (120) includes the feature extractor (124) that is configured to extract, from each flow (e.g., flow (111)) captured from the network traffic data, a number of feature elements each representing a measure of communication activity between the source and destination of the flow.

Example feature elements includes statistical measure of a packet count, a packet arrival time gap, a packet payload size, TCP/UDP flag count, out-of-sequence packet count, port numbers used, segment size, etc. Some of such examples are listed in TABLE 1 for reference purpose without limiting the scope of the invention.

TABLE 1

| Feature | Definition |
| --- | --- |
| pkts | The total number of packets in the uni-directional flow |
| bytes | The sum of the bytes of each packet |
| pay_pkts | The number of packets containing non empty payload |
| duration | The arrival time gap between the first and last packets |
| bps | Bytes per second is the ratio of total bytes over duration |
| pay_size_i | The payload size of the packets i |
| IAT_i | The inter arrival time between the packets i and i + 1 |
| max_IAT | The maximum of IAT |
| min_IAT | The minimun of IAT |
| avg_IAT | The average of IAT |
| std_IAT | The standard deviation of IAT |
| max_pay_size | The maximum of payload size |
| min_pay_size | The minimum of payload size |
| avg_pay_size | The average of payload size |
| std_pay_size | The standard deviation of payload size |

In one or more embodiments, types (e.g., pkts, bytes, etc. as listed in TABLE 1) of feature elements extracted from the feature extractor (124) are pre-configured and are the same for each flow (e.g., flow (111)) processed by the feature extractor (124) for feature extraction. Specifically, such pre-determined feature element types are the same for flows generated from different applications. Generally, different feature elements may be effective for classifying different applications. In one or more embodiments, a limited set of easily computed layer-4 features are used for analysis to reduce computational workload. For example, features that can be collected during the beginning of a flow may be used so that flows can be classified in real-time. Said in other words, the flow may be classified prior to the end of the flow. For example, the flow classification may require on the order of 100-1000 ms to complete while the flows in the batch may last 1 sec to few hours.

In one or more embodiments, such features may include (i) server port (referred to as srvPort) of a flow, (ii) the length(s) of the first i non-null segment(s) (A non-null segment is a IP packet with non-zero length of the application payload) in the flow, and (iii) inter-arrival-time(s) of such i non-null segment(s). Let a set of n features be denoted as $A(F)=\{a_1^{(F)}, a_2^{(F)} \ldots a_n^{(F)}\}$ for a flow F, the length and arrival time of the i-th segment of flow F be denoted as $len(i_F)$ and $t(i_F)$, respectively, the i-th inter-arrival time be denoted as $\Delta t(i_F)=t(i_F)-t((i-1)_F)$, the aforementioned features are then represented formally as $A(F)=\{srvPort, len(i_F), \Delta t(i_F)\}$, where i>1. For example if i=2, $A(F)=\{srvPort, len(1_F), len(2_F), \Delta t(2_F)=t(2_F)-t(1_F)\}$. In another example, if i=3, $A(F)=\{srvPort, len(1_F), len(2_F), len(3_F), \Delta t(2_F)=t(2_F)-t(1_F), \Delta t(3_F)=t(3_F)-t(2_F)\}$.

Such extracted feature elements, of the pre-configured types, form a feature vector for each flow processed by the feature extractor (124). For example, the feature extractor (124) may be configured to extract N number of types of feature elements from each flow. Such N types of feature elements form an N-dimensional space (referred to as a hyperspace) where each extracted feature vector and the corresponding flow is represented by a node. As noted above, the N dimensions are the same types of feature elements for different applications. Accordingly, feature vectors and corresponding flows extracted from flows generated by different applications are represented as nodes in this single N-dimensional space. In one or more embodiments, flows captured and processed in batches by the data collectors (114) and acquisition module (123) are stored as flow batches (e.g., flow batch (131)) in the repository (130). For example, the flows in flow batch (131) may be captured from a single node or from multiple nodes, at a particular collection time point or at multiple different collection time points, in unidirectional format or in bi-directional format, captured as a complete flow or a partial flow, or any combinations thereof. Some batches may have same number of flows while other batches may have different number of flows. The size of each batch may be pre-determined or determined dynamically while it is processed by the clustering module (125).

In one or more embodiments of the invention, the network traffic classification tool (120) includes the clustering module (125) that is configured to divide a group of flows (e.g., flow batch (131)) into a number of clusters (e.g., dominatedPort clusters (133), randomPort clusters (134) as described later) before further processing by the labeling module (126) and seed generator (127). For example, feature vectors extracted from the flows in the flow batch (131) by the feature extractor (124) may be projected into the aforementioned N-dimensional space where each flow is represented as a node (i.e., point) in the N-dimensional space. Accordingly, the flow batch (131) corresponds to multiple nodes in the N-dimensional space. In one or more embodiments, such multiple nodes are divided into clusters using unsupervised machine learning algorithm.

In one or more embodiments, network traffic is sniffed in real time and new flows are captured and processed into the flow batch (131) that is clustered and labeled prior to all such captured flows end. The algorithm shown in TABLE 2 analyzes each batch of newly captured flows via the Process-Batch( ) function. The input of this function includes the set of new flows B (e.g., flow batch (131)) and the set of seed flows S, which may be flows already analyzed and labeled in previous batches. In other example, the seed flows or other labeled flows based, for example, on DPI techniques. Its main steps in algorithm 1 are (i) clustering flows in the batch data to get homogeneous subsets of flows (function DoIterativeClustering( )), (ii) assigning flow label (function DoLabeling( ), and (iii) extracting a new set of seed flows (function ExtractSeeds( )).

TABLE 2

| Algorithm 1: Select Main loop. |
| --- |
| 1: Main( ) |
| 2:    Output: set C of labeled clusters |
| 3:    S = ∅ |
| 4:    while (newbatch B) do |
| 5:       ProcessBatch(B, S, C, NS) |
| 6:       S = NS |
| 7:    end while |
| 8: |
| 9:    ProcessBatch (B, S, X, NS): |
| 10:    Input: Set B of new flows, set S of seeds |
| 11:    Output: set X of labeled clusters, set NS of new seeds |
| 12:    B' = B ∪ S {Merge new flow and seeding set} |
| 13:    X' = doIterativeClustering(B'); |
| 14:    X = doLabeling(X'); |
| 15:    NS = extractSeeds(X); |

Generally, clustering algorithms group objects with similar characteristics. Objects are described by means of features, which map each object to a specific position in a hyperspace. The similarity between two objects is based on their distance (e.g., Euclidean distance) in the hyperspace. The closer the two objects are, the more likely they are similar and thus can be grouped in the same cluster. An example unsupervised machine learning algorithm performing the clustering is the k-means clustering algorithm known to those skilled in the art. In this context, two flows with similar packet length and inter-arrival time may be considered to be similar (i.e., close to each other in the hyperspace and likely to be generated by the same application/protocol). However, the same consideration may not hold for the srvPort feature. For instance, two flows directed to port 25 and to port 80 are not necessarily more likely to be similar to each other than two flows directed to port 80 and to port 62000. Therefore srvPort feature is excluded from the hyperspace distance computations for the clustering algorithm. In one or more embodiments, the clustering algorithm distinguishes between protocols/applications running on a specific srvPort (referred to as dominatedPort protocols/applications) versus those running on a random srvPort selected by each server (referred to as randomPort protocols/applications). Specifically, such clustering algorithm uses an iterative procedure to identify clusters of flows in which the srvPort information is used to filter elements in each cluster. As shown in the DoIterativeClustering algorithm in TABLE 3, the iterative process includes alternating clustering phases (e.g., line 6) and filtering phases (e.g., lines 8-11) through multiple iterations (e.g., lines 5-12).

The filtering procedure is shown in the DoFiltering algorithm of TABLE 4 where filtering is performed on a single cluster (i.e., I). First, in lines 4-6, DoFiltering( ) discards clusters which have less than minPoints number of flows without any further processing to avoid dealing with excessively small clusters. Flows in these clusters are returned in set U, the set of not yet clustered flows to be processed at a subsequent clustering phase. The core activity, in lines 17-18 of the filtering procedure, is the identification of dominatedPort clusters when the flag DominatingPhase is true. To this aim, the srvPort distribution in the cluster is checked. If the fraction (referred to as topPortFreq) of flows with the most frequently occurring servPort (referred to as the dominant srvPort, dominant port, or "dp") in I exceeds the threshold portFraction, the cluster is designated as a dominatedPort cluster. The flows involving the dominant srvPort are clustered together and added to the set C of final clusters (line 10-11), while flows not involving the dominant srvPort are removed and put in U (lines 12-13 where I\C' represents the remainder in I after removing C'). The dominant port dp is included in the set DP of dominant ports (lines 14-15). If there is no dominant port, all flows from 1 are put in U (lines 16-17).

When the flag DominatingPhase is false, the DoFiltering algorithm processes randomPort clusters (lines 19-20). In this case, cluster I (with all its flows) is simply added to the set of final clusters without any processing. In other examples, additional filtering action(s) may be inserted in lines 19-20.

Returning to the discussion of the iterative clustering procedure of TABLE 3. It first iteratively generates dominatedPort clusters (lines 5-12), and finally generates randomPort clusters (lines 16-20). More specifically, the set of flows to be clustered is processed for itermax number of iterations. At each iteration the set U of flows that are not yet assigned to any cluster is processed (lines 6-11) where k clusters are formed (e.g., using the k-means algorithm) and assigned to C'. Each cluster in C' then undergoes a filtering phase (lines 8-11) with the flag DominatingPhase set as true to filter dominatedPort clusters only. The DoFiltering( ) procedure returns, in U, those flows that do not pass the filtering criterion where U is to be processed at the next iteration.

At each iteration, the portFraction parameter may be updated to allow for varying degrees of filtering criteria, for example to allow more strict filtering in the initial iterations. At last, after itermax iterations, randomPort clusters are handled (lines 16-20). At this point, the information carried by the dominant port dp is considered fully exploited in previous phases, and the set of dominant ports DP contains all srvPort that appeared as dominant in the prior processing. Therefore all flows involving any port in DP (referred to as flows still to DP) at this point are removed from U (lines 13-15) before the final clustering and filtering phases (line 16-20) are completed for randomPort clusters. In one or more embodiments, the flow batch (131) includes exclusively unidirectional flows each associated with a source port, a destination port, and a flow direction attribute. In this context, the servPort is the destination port and hence the use of "flows still to DP" for referring to those remaining flows in U that sill involve any port in DP.

TABLE 3

Algorithm 3: Iterative Clustering

| | |
|---|---|
| 1: | doIterativeClustering(B) |
| 2: | Input: Set B of flows to be clustered |
| 3: | Output: set of clusters C |
| 4: | C = ∅, U = B, DP = ∅ |
| 5: | for (step = 1; step ≤ intermax; step++) do |
| 6: |    C' = kmeans(U) |
| 7: |    U = ∅, update(portFraction) |
| 8: |    for I in C' do |
| 9: |      {look for dominatedPort clusters first} |
| 10: |      doFiltering(I,C,U,DP, portFraction, true) |
| 11: |    end for |
| 12: | end for |
| 13: | for dp in DP do |
| 14: |    delFlows(U,dp) {Discard flows still to DP} |
| 15: | end for |
| 16: | C' = k-means(U) |
| 17: | for I in C' do |
| 18: |    {look for randomPort clusters now} |
| 19. |    doFiltering(I,C,U,DP,0,false) |
| 20: | end for |
| 21: | return C |

TABLE 4

Algorithm 2: Filtering of clusters

| | |
|---|---|
| 1: | doFiltering(I, C, U, DP, portFraction, DominatingPhase) |
| 2: | Input: cluster I of flows, DominatingPhase flag |
| 3: | Output: set C of clusters, set U of noise, set DP of dominant ports. |
| 4: | if ‖I‖ < minPoints then |
| 5: |    U = U ∪ I; return |
| 6: | end if |
| 7: | if DominatingPhase then |
| 8: |    {Processing dominatedPort cluster} |
| 9: |    if (topPortFreq(I) > portFraction) then |
| 10: |      C' = getFlows(I,dp) |
| 11: |      C = C ∪ C' {Add the filtered cluster to C} |
| 12: |      R = I \ C' |
| 13: |      U = U ∪ R {Put discarded flows in U} |
| 14: |      dp = dominantPort(I) |
| 15: |      DP = DP ∪ {dp} {Record dominant port} |
| 16: |    else |
| 17: |      U = U ∪ I {I flows must be reclustered} |
| 18: |    end if |
| 19: | else |
| 20: |    C = C ∪ I {I is a good cluster at last} |
| 21: | end if |

In one or more embodiments of the invention, the network traffic classification tool (120) includes the labeling module (126) that is configured to perform the DoLabeling( ) in TABLE 2 to assign a label to each cluster. For each cluster I in C', flows are checked to identify any flow that has already been labeled, e.g., belonging to a non-null S. If multiple labeled flows are present in the cluster I, a voting scheme is adopted according to select the label with the largest frequency of occurrence for labeling all the flows in I, possibly over-ruling a previous conflicting label for seed flows. More complicated voting schemes may also be adopted (e.g., by requiring that the most frequently occurred label to win the voting by a pre-determined winning margin such as 50% or more).

If no seed flows are present in the cluster I, the cluster I is labeled as "unknown" and passed to the system administrator user, for example to manually label the cluster. For example, such manual labeling may occur during the bootstrapping of the analysis when no labeled flows are present. Alternatively, a set of bootstrapping flows can be generated by providing labels obtained by some other available traffic classification tools, such as a DPI classifier. Similarly, a bootstrapping seed flow set can be obtained by considering some active experiments in which traffic of a targeted application is generated. Finally, labels can be manually assigned by using the domain knowledge of the system administrator user. In summary, the complexity of the labeling process is reduced to the analysis of few clusters, instead of thousands of flows.

In one or more embodiments of the invention, the network traffic classification tool (120) includes the seed generator (127) that is configured to automatically extract a set of seed flows from the final clusters after processing a batch to be reused to process next batches. Specifically, this is achieved by the extractSeeds( ) procedure in TABLE 2. Let numSeeds be the target number of seed flows, i.e., numSeeds=$\|NS\|$. In one or more embodiments, for each labeled cluster I, a number of labeled flows proportional to the cluster size are extracted at random. That is, $\|I\|*\|NS\|/\|C\|$ flows are randomly selected. This sampling process ensures that all clusters contribute to NS. In other embodiments, other types of sampling schemes may also be used.

While specific components are depicted and/or described for use in the units and/or modules of the network traffic classification tool (120), it will be appreciated that a variety of components with various functions may be used to provide the formatting, processing, utility and coordination functions necessary to modify various working data used by the network traffic classification tool (120). The components may have combined functionalities and may be implemented as software, hardware, firmware, or combinations thereof.

Figure 2:
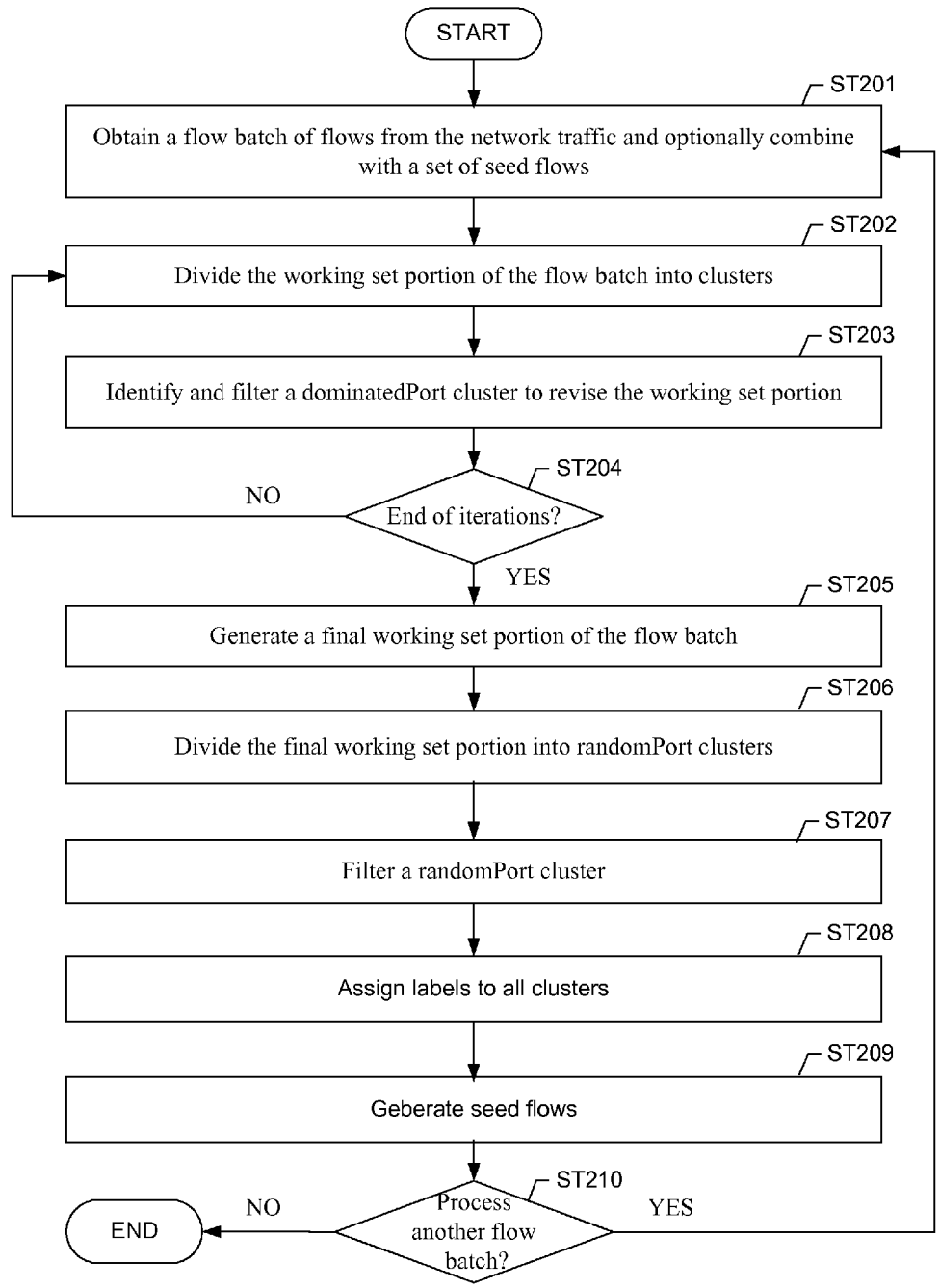
FIG. 2 shows a method flow chart according to aspects of the invention.

FIG. 2 depicts a method flowchart of methods in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1 above.

Initially in Step 201, flows are obtained from the network traffic and stored as a group that is referred to as a flow batch. In one or more embodiments, each flow in the flow batch is a unidirectional flow represented by a feature vector A(F)= {srvPort, len($i_F$), Δt($i_F$)}, where i is a pre-determined integer number. In one or more embodiments, the flows are optionally combined with a set of seed flows to form the flow batch. In particular, the seed flows are pre-labeled flows used as seeds for subsequent cluster labeling actions. For example, the seed flows may be pre-labeled during processing of a previous flow batch or pre-labeled using techniques such as DPI. In one or more embodiments, the flow batch is associated with a start capture time and a stop capture time that define the time period when flows are captured into the flow batch. In one or more embodiments, Steps 202 through 209 are performed subsequent to the stop capture time. In one or more embodiments, Steps 202 through 209 are performed independent of the stop capture time. Said in other words, the stop capture time may occur during or at the end of any of the steps or any of the iteration loops. In such embodiments, the stop capture time may be pre-determined or may be dynamically determined based on an event or condition during the execution of Steps 202 through 209.

The flow batch is then processed in multiple iterations of Steps 202, 203, and 204. As noted above, all flows in the flow batch are processed in the initial iteration while an iteratively revised working set portion is processed in each subsequent iteration after newly generated dominatedPort clusters are removed before the next iteration. In those embodiments where one or more iterations are performed prior to the stop capture time, additional new flows may be incrementally added to the revised working set in-between those iterations that occur prior to the stop capture time. Accordingly, each revised working set portion may increase or decrease in size relative to a previous working set portion processed in a previous iteration. In this context, the initial working set portion (i.e., the entire portion of the flow batch) and any revised working set portion are generally referred to as a working set portion. In one or more embodiments, dominatedPort clusters are generated in each iteration by dividing and filtering the corresponding working set portion.

In Step 202 of an iteration, the working set portion of the iteration is divided into multiple clusters in a clustering phase of the iteration. In one or more embodiments, flows in the working set portion are divided into multiple clusters using unsupervised machine learning algorithm (e.g., k-means algorithm) based on the aforementioned feature vectors A(F)={len($i_F$), Δt($i_F$)} each representing a flow in the working set portion. Note that the srvPort feature is excluded from the unsupervised machine learning algorithm. Instead, this srvPort feature is used in a filtering phase of the iteration described below. In those embodiments where one or more iterations are performed prior to the stop capture time, any incremental addition of new flows into the working set portion may be withheld during each clustering phase to allow proper operation of the unsupervised machine learning algorithm.

In Step 203, a cluster from the divided working set portion is filtered based on servPort of each flow in the cluster. In one or more embodiments, a servPort is identified as most frequently occurring comparing to all other servPorts in the cluster. Said in other words, the servPort that occurs most frequently in flows (i.e., having the highest frequency of occurrence in the flows) is identified. If the frequency of occurrence of this identified servPort in the cluster exceeds a pre-determined threshold (i.e., portFraction in TABLE 4), the cluster is identified as a dominatedPort cluster. In response, this cluster is removed from the working set portion to generate a remainder as another working set portion (i.e., revised working set portion) to be processed in the next iteration. Before this another working set portion (i.e., revised working set portion) is processed, those flows having different servPort than the identified most frequently occurring servPort are removed from the dominatedPort cluster and added back into the another working set portion to be processed in the next iteration. In an alternative procedure, those flows having different servPort than the identified most frequently occurring servPort are removed from the dominatedPort cluster first before the resultant dominatedPort cluster is removed from the working set portion to generate the remainder as the another working set portion. Using either of these procedures, after completing the filtering step, the resultant dominatePort cluster is homogeneous in the sense that all flows in the domiantedPort cluster have the same servPort. Such servPort is designated as a dominant servPort (i.e., dp in TABLE 4) and registered in a set of dominant servPorts (i.e., DP in TABLE 4).

In one or more embodiments, each cluster generated from the unsupervised machine learning algorithm is filtered as described above such that the working set portion is successively reduced when the cluster is identified as a dominatedPort cluster and removed. If a particular cluster is not identified as a dominatedPort cluster due to lack of an identifiable dominant servPort, this particular cluster is included in the another working set portion to be processed in the next iteration. After all clusters generated from the unsupervised machine learning algorithm in the clustering phase are processed in this manner to complete the filtering phase, the method proceeds to Step 204 where a decision is made as to whether the end of iterations has been reached. In those embodiments where one or more iterations are performed prior to the stop capture time, the another working set portion may be further increased in size to include any incremental new flows before proceeding to Step 204.

In one or more embodiments, the number of iterations is pre-determined, such as itermax in TABLE 4. In one or more embodiments, the end of iterations is determined dynamically based on a measure computed within each iteration. When the computed measure meets a pre-determined criterion, the end of iteration is considered being reached. For example, such pre-determined criterion may be based on a convergence condition related to incremental progress in additional dominatedPort clusters identified for the iteration. More details are described in reference to FIGS. 3A and 3B below.

In Step 204, if the end of iteration has not been reached, the method returns to Step 202 to perform the next iteration for iteratively processing the aforementioned another working set portion using the procedures described above. If the end of iteration has been reached, the method proceeds to Step 205.

In Step 205, the remaining working set portion is considered the final working set portion from which randomPort clusters are generated. For example, in Step 206, the randomPort clusters may be generated from the final working set portion using unsupervised machine learning algorithm based on the aforementioned feature vectors $A(F)=\{\text{len}(i_F), \Delta t(i_F)\}$ each representing a flow in the final working set portion. In one or more embodiments, the final working set portion is filtered in Step 205 one last time before applying the unsupervised machine learning algorithm. Specifically, any flow in the final working set portion that is still associated with any servPort (i.e., dp) belonging to the set (i.e., DP) of dominant servPorts is removed from the final working set portion to generate a filtered final working set portion. Accordingly, in Step 206, this filtered final working set portion is then divided into the randomPort clusters using the unsupervised machine learning algorithm.

In Step 207, for each flow each dominatedPort cluster and each randomPort cluster, a corresponding label is assigned. In one or more embodiments, each cluster is assigned a unique label. In one or more embodiments, each label corresponds to an application executing in the network, where all flows in the labeled cluster are considered to be generated by this application. In one or more embodiments, each flow in the cluster is checked to see if any flow is already pre-labeled. For example, such pre-labeled flow may be a seed flow combined into the flow batch from a set of seed flow in Step 201. In another example, such pre-labeled flow may be manually labeled based on DPI techniques to identify pre-existing labels for network applications. Once a pre-labeled flow is found in a cluster, all other flows in the cluster are assigned the same label. If multiple pre-labeled flows are found in the cluster, a majority voting scheme may be used to select one label for assigning to all flows in the cluster.

In Step 209, after all clusters are labeled in Step 208, a number of labeled flows are extracted as seed flows for use in processing another flow batch. For example, one or more labeled flow(s) may be extracted from each of the clusters such that the seed flows include contribution from all clusters.

In Step 210, a determination is made as to if there is another flow batch to be processed. If the determination is yes, the method returns to Step 201. If the determination is no, the method ends. In one or more embodiments, the flow batch(s) is pre-collected. In such embodiments, the determination in Step 201 relates whether a new classification session is to start for classifying another pre-collected flow batch. In one or more embodiments, the iterative clustering and filtering described above are applied to classify flows in real time in a classification session. Said in other words, either based on a pre-determined number of iterations or based on a convergence condition, the method steps reach Step 210 (referred to as completing the classification session) prior to at least a portion of the flows in the flow batch end. In such embodiments, the determination in Step 210 relates to whether a new classification session is to start by collecting new flows into a new flow batch for real time classification.

FIGS. 3A and 3B show an example according to aspects of the invention. FIG. 3A shows the percentage of clustered flows during different iterations (i.e., steps 1 through 4) of iterative clustering over four different flow batches (i.e., dataset 1S through 4S). As shown, most of the flows are clustered during step 1, when there are many dominatedPort clusters (i.e., clusters in which most of the flows involve the same port). Small clusters and outlier flows are excluded from the clusters in step 1 and passed to step 2 for processing. At this point, an additional fraction of dominatedPort clusters are identified, allowing about 10-15% more flows to be clustered. Again, small clusters and outlier flows are excluded from the clusters in step 2 and passed to step 3 for processing. This clustering/filtering is repeated one more time at step 3 when another about 5-10% of flows are clustered. As a last step, randomPort clusters are generated in step 4 and an additional fraction of flows gets properly clustered, for example corresponding to peer-to-peer (P2P) protocols. As the curves suggest, the benefit of adding more iterations of dominatedPort filtering phases diminishes, and little improvement is achieved by setting itermax larger than 3.

To confirm this observation of the example result, FIG. 3B shows, for each step, the fraction of flows (represented by the vertical axis) directed to the dominating port in each cluster (each represented by a cluster ID in the horizontal axis) with more than minPoints flows. Clusters are sorted in decreasing fraction for the ease of visualization. The number of dominatedPort clusters is large during step 1, with 70 clusters having more than 50% of flows are directed to the same srvPort. Given in this example portFraction=0.5, flows are selected in the clusters that involve the dominating port. In step 2, the number of dominatedPort clusters decreases, and only 17 clusters pass the portFraction=0.5 filtering criteria. In step 3, very few dominatedPort clusters are present. This confirms the observation 3 iteration steps are adequate for this example because the information carried by the srvPort has already been sufficiently exploited. In addition, the observation suggests relaxing the portFraction threshold during the last step, which was set at 0.2 for the last iteration.

Although specific formats, structures, or partitions are used as examples in the foregoing description regarding the various components in the network traffic classification tool, user system, and computer network, one skilled in the art, with the benefit of this disclosure, would recognize that other formats or structures may also be used in the system, methods, and examples described without deviating from the spirit of the invention.

Figure 4:
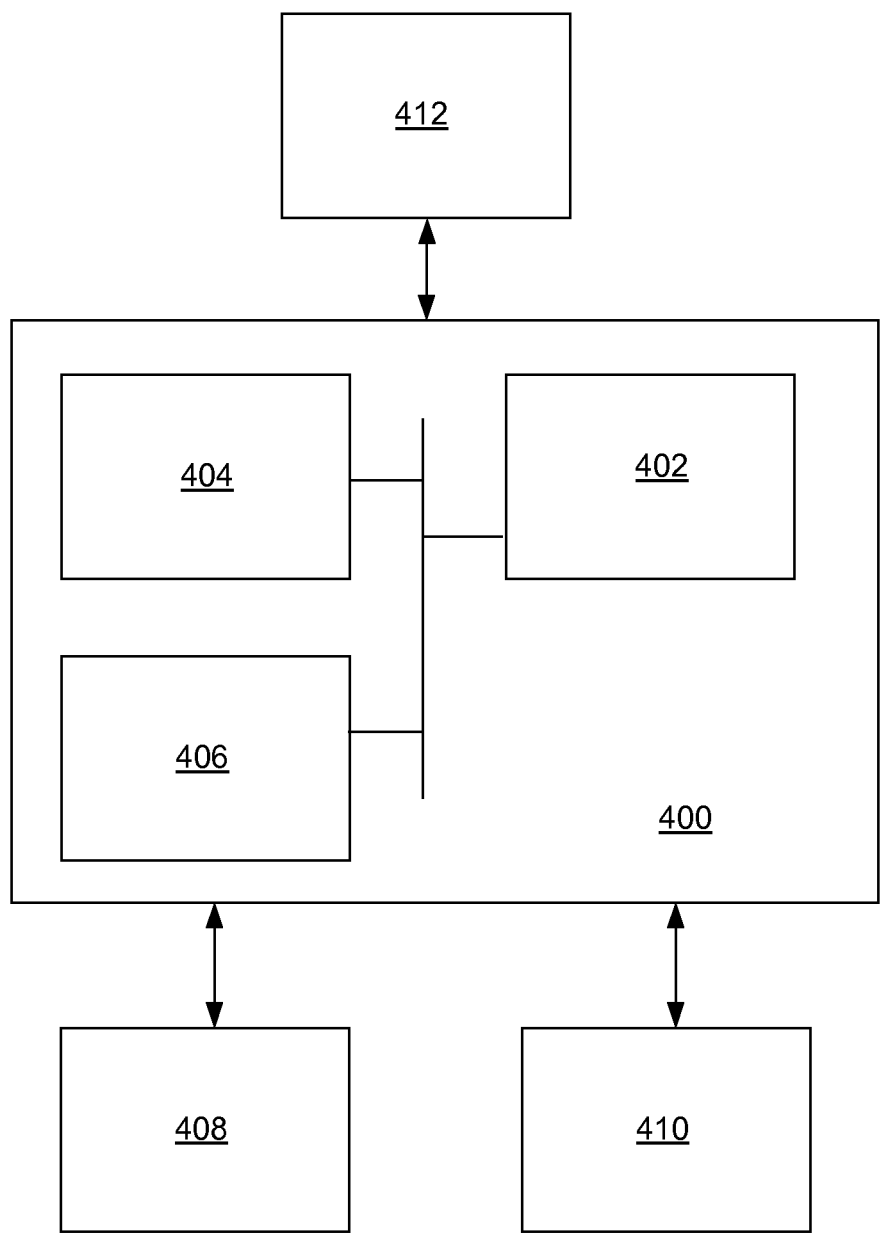
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402) (e.g., central processing unit or CPU), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for classifying network traffic in a network, comprising:

obtaining a first flow batch comprising a first plurality of flows from the network traffic;

processing, by a processor of a computer system, a first working set portion of the first flow batch for a first iteration based on a first pre-determined algorithm, comprising:

dividing the first working set portion into a plurality of clusters; and filtering, based on a server port found in the cluster, a cluster of the plurality of clusters to generate a filtered cluster and a second working set portion of the first flow batch;

processing the second working set portion for a second iteration based on the first pre-determined algorithm; and classifying the first flow batch based at least on the filtered cluster, wherein filtering the cluster based on the server port comprises:

identifying a first server port as most frequently occurring comparing to all other server ports in the cluster;

in response to determining that a first frequency of occurrence of the first server port in the cluster exceeds a pre-determined threshold:

removing, from the cluster, a flow having a different server port than the first server port to generate the filtered cluster, wherein the filtered cluster is identified as a dominatedPort cluster based on a pre-determined criterion; and removing the dominatedPort cluster from the first working set portion to generate a remainder as a second working set portion.

2. A method for classifying network traffic in a network, comprising:

obtaining a first flow batch comprising a first plurality of flows from the network traffic;

processing, by a processor of a computer system, a first working set portion of the first flow batch for a first iteration based on a first pre-determined algorithm, comprising:

dividing the first working set portion into a plurality of clusters; and filtering, based on a server port found in the cluster, a cluster of the plurality of clusters to generate a filtered cluster and a second working set portion of the first flow batch;

processing the second working set portion for a second iteration based on the first pre-determined algorithm; and classifying the first flow batch based at least on the filtered cluster, wherein any flow having any different server port than the first server port is excluded from the filtered cluster to generate the dominatedPort cluster, and wherein each flow in the dominatedPort cluster comprises the first server port.

3. The method of claim 1,
wherein the first working set portion is divided into the plurality of clusters using an unsupervised machine learning algorithm based on a plurality of feature vectors each extracted from one of the first plurality of flows.

4. The method of claim 1; further comprising:
obtaining a final working set portion after performing a first plurality of iterations;
generating a filtered final working set portion by removing any flow in the final working set portion that is still associated with any server port belonging to a set of dominant server ports, wherein filtering the cluster comprises adding the first server port to the set of dominant server ports; and
dividing the filtered final working set portion into a plurality of randomPort clusters using the unsupervised machine learning algorithm.

5. The method of claim 4; further comprising:
assigning, based on a second pre-determined algorithm, a label to each flow in at least one cluster selected from a group consisting of the dominatedPort cluster and each of the plurality of randomPort clusters,
wherein the label corresponds to an application executing in the network, and
wherein all flows in the at least one cluster are generated by the application.

6. The method of claim 5, wherein assigning the label to each flow in the at least one cluster comprises:
identifying a labeled flow in the at least one cluster, wherein the labeled flow is labeled based on at least one selected from a group consisting of deep packet inspection and a previous iteration of processing the first flow batch; and
using a label already assigned to the labeled flow to assign each flow in the at least one cluster.

7. The method of claim 5; further comprising:
extracting, based on a third pre-determined algorithm, a plurality of labeled flows from the at least one cluster to form a set of seed flows;
combining the set of seed flows with a second flow batch comprising a second plurality of flows from the network traffic; and
processing the second flow batch for a second plurality of iterations based on the first pre-determined algorithm.

8. The method of claim 1,
wherein the first iteration is an initial iteration of processing the first flow batch,
and wherein the first working set portion comprises all flows in the first flow batch.

9. A system for classifying network traffic in a network, comprising:
a hardware processor;
an acquisition module configured to obtain a first flow batch comprising a first plurality of flows from the network traffic; and
a clustering module executing on the hardware processor and configured to:
process a first working set portion of the first flow batch for a first iteration based on a first pre-determined algorithm, comprising:
dividing the first working set portion into a plurality of clusters; and
filtering a cluster of the plurality of clusters based on a server port found in the cluster to generate a filtered cluster and a second working set portion of the first flow batch;
process the second working set portion for a second iteration based on the first pre-determined algorithm; and
classify the first flow batch based at least on the filtered cluster,
wherein filtering the cluster based on the server port comprises:
identifying a first server port as most frequently occurring comparing to all other server ports in the cluster;
in response to determining that a first frequency of occurrence of the first server port in the cluster exceeds a pre-determined threshold:
removing, from the cluster, a flow having a different server port than the first server port to generate the filtered cluster, wherein the filtered cluster is identified as a dominatedPort cluster based on a pre-determined criterion; and
removing the dominatedPort cluster from the first working set portion to generate a remainder as a second working set portion.

10. A system for classifying network traffic in a network, comprising:
a hardware processor;
an acquisition module configured to obtain a first flow batch comprising a first plurality of flows from the network traffic; and
a clustering module executing on the hardware processor and configured to:
process a first working set portion of the first flow batch for a first iteration based on a first pre-determined algorithm, comprising:
dividing the first working set portion into a plurality of clusters; and
filtering a cluster of the plurality of clusters based on a server port found in the cluster to generate a filtered cluster and a second working set portion of the first flow batch;
process the second working set portion for a second iteration based on the first pre-determined algorithm; and
classify the first flow batch based at least on the filtered cluster,
wherein any flow having any different server port than the first server port is excluded from the filtered cluster to generate the dominatedPort cluster, and
wherein each flow in the dominatedPort cluster comprises the first server port.

11. The system of claim 9,
wherein the first working set portion is divided into the plurality of clusters using an unsupervised machine learning algorithm based on a plurality of feature vectors each extracted from one of the first plurality of flows.

12. The system of claim 11 the clustering module further configured to:
obtain a final working set portion after performing a first plurality of iterations;
generate a filtered final working set portion by removing any flow in the final working set portion that is still associated with any server port belonging to a set of dominant server ports, wherein filtering the cluster comprises adding the first server port to the set of dominant server ports; and
divide the filtered final working set portion into a plurality of randomPort clusters using the unsupervised machine learning algorithm.

13. The system of claim 12; further comprising a labeling module configured to:
  assign, based on a second pre-determined algorithm, a label to each flow in at least one cluster selected from a group consisting of the dominatedPort cluster and each of the plurality of randomPort clusters,
  wherein the label corresponds to an application executing in the network, and
  wherein all flows in the at least one cluster are generated by the application.

14. The system of claim 13, wherein assigning the label to each flow in the at least one cluster comprises:
  identifying a labeled flow in the at least one cluster, wherein the labeled flow is labeled based on at least one selected from a group consisting of deep packet inspection and a previous iteration of processing the first flow batch; and
  using a label already assigned to the labeled flow to assign each flow in the at least one cluster.

15. The system of claim 13; further comprising a seed generator configured to:
  extract, based on a third pre-determined algorithm, a plurality of labeled flows from the at least one cluster to form a set of seed flows;
  combine the set of seed flows with a second flow batch comprising a second plurality of flows from the network traffic; and
  process the second flow batch for a second plurality of iterations based on the first pre-determined algorithm.

16. The system of claim 9,
  wherein the first iteration is an initial iteration of processing the first flow batch,
  and wherein the first working set portion comprises all flows in the first flow batch.

17. A non-transitory computer readable medium storing instructions for classifying network traffic in a network, the instructions, when executed by a processor of a computer, comprising functionality for:
  obtaining a first flow batch comprising a first plurality of flows from the network traffic;
  processing a first working set portion of the first flow batch for a first iteration based on a first pre-determined algorithm, comprising:
    dividing the first working set portion into a plurality of clusters; and
    filtering, based on a server port found in the cluster, a cluster of the plurality of clusters to generate a filtered cluster and a second working set portion of the first flow batch;
  processing the second working set portion for a second iteration based on the first pre-determined algorithm; and
  classifying the first flow batch based at least on the filtered cluster,
  wherein filtering the cluster based on the server port comprises:
    identifying a first server port as most frequently occurring comparing to all other server ports in the cluster;
    in response to determining that a first frequency of occurrence of the first server port in the cluster exceeds a pre-determined threshold:
      removing, from the cluster, a flow having a different server port than the first server port to generate the filtered cluster, wherein the filtered cluster is identified as a dominatedPort cluster based on a pre-determined criterion; and
      removing the dominatedPort cluster from the first working set portion to generate a remainder as a second working set portion.

18. A non-transitory computer readable medium storing instructions for classifying network traffic in a network, the instructions, when executed by a processor of a computer, comprising functionality for:
  obtaining a first flow batch comprising a first plurality of flows from the network traffic;
  processing a first working set portion of the first flow batch for a first iteration based on a first pre-determined algorithm, comprising:
    dividing the first working set portion into a plurality of clusters; and
    filtering, based on a server port found in the cluster, a cluster of the plurality of clusters to generate a filtered cluster and a second working set portion of the first flow batch;
  processing the second working set portion for a second iteration based on the first pre-determined algorithm; and
  classifying the first flow batch based at least on the filtered cluster,
  wherein any flow having any different server port than the first server port is excluded from the filtered cluster to generate the dominatedPort cluster, and
  wherein each flow in the dominatedPort cluster comprises the first server port.

19. The non-transitory computer readable medium of claim 17,
  wherein the first working set portion is divided into the plurality of clusters using an unsupervised machine learning algorithm based on a plurality of feature vectors each extracted from one of the first plurality of flows.

20. The non-transitory computer readable medium of claim 17, the instructions, when executed by the processor, further comprising functionality for:
  obtaining a final working set portion after performing a first plurality of iterations;
  generating a filtered final working set portion by removing any flow in the final working set portion that is still associated with any server port belonging to a set of dominant server ports, wherein filtering the cluster comprises adding the first server port to the set of dominant server ports; and
  dividing the filtered final working set portion into a plurality of randomPort clusters using the unsupervised machine learning algorithm.

21. The non-transitory computer readable medium of claim 20, the instructions, when executed by the processor, further comprising functionality for:
  assigning, based on a second pre-determined algorithm, a label to each flow in at least one cluster selected from a group consisting of the dominatedPort cluster and each of the plurality of randomPort clusters,
  wherein the label corresponds to an application executing in the network, and
  wherein all flows in the at least one cluster are generated by the application.

22. The non-transitory computer readable medium of claim 21, wherein assigning the label to each flow in the at least one cluster comprises:
  identifying a labeled flow in the at least one cluster, wherein the labeled flow is labeled based on at least one selected from a group consisting of deep packet inspection and a previous iteration of processing the first flow batch; and using a label already assigned to the labeled flow to assign each flow in the at least one cluster.

23. The non-transitory computer readable medium of claim 21, the instructions, when executed by the processor, further comprising functionality for:
   extracting, based on a third pre-determined algorithm, a plurality of labeled flows from the at least one cluster to form a set of seed flows;
   combining the set of seed flows with a second flow batch comprising a second plurality of flows from the network traffic; and
   processing the second flow batch for a second plurality of iterations based on the first pre-determined algorithm.

24. The non-transitory computer readable medium of claim 18,
   wherein the first iteration is an initial iteration of processing the first flow batch,
   and wherein the first working set portion comprises all flows in the first flow batch.

* * * * *